United States Patent
Lu et al.

(10) Patent No.: US 12,297,127 B2
(45) Date of Patent: May 13, 2025

(54) PROCESS FOR CONTROLLING TREATMENT OF WASTE FLUID GENERATED DURING PETROCHEMICAL PROCESS USING INCINERATOR

(71) Applicant: SULZER MANAGEMENT AG, Winterthur (CH)

(72) Inventors: Jen-Shiung Lu, New Taipei (TW); Ken Kondo, Hiroshima (JP); Jiaping Toh, Singapore (SG); Halbe Anne Jansen, Eschlikon (CH); Claudia Pudack, Zürich (CH)

(73) Assignee: SULZER MANAGEMENT AG, Winterthur (CH)

(*) Notice: Subject to any disclaimer, the term of this patent is extended or adjusted under 35 U.S.C. 154(b) by 400 days.

(21) Appl. No.: 17/781,366

(22) PCT Filed: Dec. 14, 2020

(86) PCT No.: PCT/EP2020/086030
§ 371 (c)(1),
(2) Date: May 31, 2022

(87) PCT Pub. No.: WO2021/122478
PCT Pub. Date: Jun. 24, 2021

(65) Prior Publication Data
US 2023/0002250 A1    Jan. 5, 2023

(30) Foreign Application Priority Data
Dec. 19, 2019    (EP) ..................................... 19218192

(51) Int. Cl.
*C02F 1/22*    (2023.01)
*C02F 1/04*    (2023.01)
(Continued)

(52) U.S. Cl.
CPC ................ *C02F 1/22* (2013.01); *C02F 1/048* (2013.01); *C02F 1/26* (2013.01); *C02F 1/72* (2013.01);
(Continued)

(58) Field of Classification Search
CPC .... C02F 1/22; C02F 1/048; C02F 1/26; C02F 9/00; C02F 2103/365
See application file for complete search history.

(56) References Cited

U.S. PATENT DOCUMENTS

| | | |
|---|---|---|
| 5,032,148 A | 7/1991 | Baker et al. |
| 6,164,087 A | 12/2000 | Ruemekorf |

(Continued)

FOREIGN PATENT DOCUMENTS

| | | |
|---|---|---|
| CN | 101078520 A | 11/2007 |
| CN | 202973117 U | 6/2013 |

(Continued)

OTHER PUBLICATIONS

First Office Action issued Aug. 21, 2023 in corresponding Chinese Application No. 202080087766.1.
(Continued)

*Primary Examiner* — Renee Robinson
(74) *Attorney, Agent, or Firm* — Global IP Counselors, LLP

(57) ABSTRACT

A process for treating waste fluid generated during a petrochemical process. The process comprises: subjecting at least one first water-based wastewater stream to at least one freeze concentration stage so as to produce a third clean water stream and a fourth concentrated water-based wastewater stream, subjecting at least one second organic fluid-based waste fluid stream to at least one separation stage so as to produce a fifth purified product stream and a sixth concentrated organic fluid-based waste fluid stream, forwarding the (Continued)

fourth concentrated water-based wastewater stream and the sixth concentrated organic fluid-based waste fluid stream to an incinerator, and incinerating the streams in the incinerator. The process is controlled such that incineration of the sixth concentrated organic fluid-based waste fluid stream generates at least 70% of an energy necessary to incinerate the fourth concentrated water-based wastewater stream.

16 Claims, 3 Drawing Sheets

(51) Int. Cl.
      *C02F 1/26*    (2023.01)
      *C02F 1/72*    (2023.01)
      *C02F 9/00*    (2023.01)
      *C02F 11/06*    (2006.01)
      C02F 1/52    (2023.01)
      C02F 103/36    (2006.01)

(52) U.S. Cl.
    CPC .............. *C02F 9/00* (2013.01); *C02F 11/06* (2013.01); *C02F 2001/5218* (2013.01); *C02F 2103/365* (2013.01); *C02F 2303/10* (2013.01)

(56) References Cited

U.S. PATENT DOCUMENTS

| | | |
|---|---|---|
| 2003/0029814 A1 | 2/2003 | Begell et al. |
| 2015/0203373 A1 | 7/2015 | Dette et al. |
| 2018/0297910 A1 | 10/2018 | Van Mourik |

FOREIGN PATENT DOCUMENTS

| | | |
|---|---|---|
| CN | 103502235 A | 1/2014 |
| CN | 107129424 A | 9/2017 |
| JP | S5095177 | 7/1975 |
| JP | H05245498 A | 9/1993 |
| JP | 2000055335 A | 2/2000 |
| KR | 20040072385 A | 8/2004 |
| TW | 200413300 A | 8/2004 |
| WO | 0100534 A1 | 1/2001 |

OTHER PUBLICATIONS

Chinese Search Report issued in corresponding Chinese Application No. 202080087766.1.
Communication pursuant to Article 94(3) dated Sep. 30, 2024 for EP Application No. 20821248.0.
S. Lemmer et al.; "Preconcentration of wastewater through the Niro Freeze Concentration Process"; pp. 485-488; Chem. Eng. Technol. 24; c. 2001; Weinheim, Germany; XP055691176.
Moldenhauer Wolfgang et al.; "Wastewater, 6. Incineration"; pp. 711-718; Ullmann's Encyclopedia of Industrial Chemistry; c. 2012; Weinheim, Germany; XP055858364.
European Search Report issued May 18, 2020 in corresponding European Application No. 19218192.3.
International Search Report issued Mar. 4, 2021 in corresponding International Application No. PCT/EP2020/086030.
Written Opinion issued Nov. 16, 2021 in corresponding International Application No. PCT/EP2020/086030.

PROCESS FOR CONTROLLING TREATMENT OF WASTE FLUID GENERATED DURING PETROCHEMICAL PROCESS USING INCINERATOR

CROSS-REFERENCE TO RELATED APPLICATION

This application is a U.S. National Stage application if International Application No. PCT/EP2020/086030, filed Dec. 14, 2020, which claims priority to European Patent Application No. 19218192.3, filed Dec. 19, 2019, the contents of which are hereby incorporated by reference.

FIELD OF THE INVENTION

The present disclosure relates to a process for treating waste fluid generated during a petrochemical process, wherein the waste fluid comprises a first water-based wastewater stream and a second organic fluid-based waste fluid stream.

BACKGROUND OF THE INVENTION

During a high number of petrochemical processes, such as those making use of one or more distillation or rectification steps, waste fluids comprising at least one water-based wastewater stream as well as at least one organic fluid-based waste fluid stream are generated. Both fluids must then be treated, purified or disposed, for instance by incineration. Examples of such petrochemical processes are the production of phenol and acetone from a feed stream containing benzene and propylene via the cumene hydroperoxide process and the production of propylene oxide using cumene.

SUMMARY

The cumene hydroperoxide process comprises the reaction of benzene and propylene to cumene, before the cumene is converted in the presence of molecular oxygen to cumene hydroperoxide, which is then cleaved, usually using an acid catalyst, into phenol and acetone. The cleavage product contains the products phenol and acetone as well as a couple of by-products and impurities, such as acetophenone, cumene, 2-phenyl-2-propanol and others. Conventionally, the phenol and acetone products are separated from the cleavage product by distillation. Moreover, the unconverted cumene is conventionally recovered from the cleavage product, purified by vacuum distillation and recycled into the process. The other by-products and impurities have to be processed. For instance, in a plant designed to produce 200 kilotons per annum phenol, about 1,000 kg per hour of a heavy waste oil stream containing about 20% by weight of acetophenone and the remainder other impurities and by-products and about 5,000 to 10,000 kg per hour of a wastewater stream, which contains methanol, acetone, phenol, cumene and others, are generated.

Another illustrative example of a petrochemical process, during which significant amounts of waste fluids comprising at least one water-based wastewater stream and at least one organic fluid-based waste fluid stream are generated, is the production of propylene oxide using cumene. During this process, cumene is oxidized in air to obtain cumene hydroperoxide, wherein the cumene hydroperoxide is used to epoxidize propylene in the presence of an appropriate epoxidation catalyst to propylene oxide. The cumene is converted during the epoxidation to dimethyl benzyl alcohol, which is hydrogenated with molecular hydrogen so as to recover the cumene. After purification, the recovered cumene is recycled to the cumene oxidation step. During this process significant amounts of organic fluid-based waste fluid streams containing acetophenone, phenol and the remainder other impurities and by-products are generated, as well as wastewater, which contains phenol, other impurities and by-products.

One option for processing the waste stream(s) is to dispose them for instance by incineration. Such a method is for instance disclosed in U.S. Pat. No. 6,164,087. More specifically, the method disclosed in this document comprises concentrating a water-based wastewater stream, before subjecting it together with another waste fluid stream to incineration. The purpose of concentrating a water-based wastewater stream, before subjecting it together with the other waste fluid stream to incineration, is to reduce the energy required for the incineration by removing some of the water included in the original wastewater stream. However, this process still requires a lot of energy for the incineration.

In view of this, the object underlying the present disclosure is to provide a process for treating waste fluid generated during a petrochemical process by incineration, wherein the waste fluid comprises at least one water-based wastewater stream and at least one organic fluid-based waste fluid stream, wherein the process exploits as much as possible of the components of the waste fluid but nevertheless requires a minimum amount of energy for the incineration.

In accordance with the present disclosure, this object is satisfied by providing a process for treating or purifying waste fluid generated during a petrochemical process, the waste fluid comprising at least one first water-based wastewater stream and at least one second organic fluid-based waste fluid stream, the process comprising:

subjecting the at least one first water-based wastewater stream to at least one freeze concentration stage so as to produce a third clean water stream and a fourth concentrated water-based wastewater stream, subjecting the at least one second organic fluid-based waste fluid stream to at least one separation stage so as to produce a fifth purified product stream and a sixth concentrated organic fluid-based waste fluid stream, and forwarding the fourth concentrated water-based wastewater stream and the sixth concentrated organic fluid-based waste fluid stream to an incinerator and incinerating the fourth concentrated water-based wastewater stream and the sixth concentrated organic fluid-based waste fluid stream in the incinerator, the process being controlled such that incineration of the sixth concentrated organic fluid-based waste fluid stream generates at least 70% of an energy necessary to incinerate the fourth concentrated water-based wastewater stream.

By controlling the process so that the incineration of the sixth concentrated organic fluid-based waste fluid stream generates at least 70% of the energy necessary to incinerate the fourth concentrated water-based wastewater stream, at least the major part of the energy required for the incineration of the fourth concentrated water-based wastewater stream is exploited from the sixth concentrated organic fluid-based waste fluid stream being generated during the process. In other words, the sixth concentrated organic fluid-based waste fluid stream is used as fuel for the incineration, however, only after one or more valuable compounds being included in the second organic fluid-based waste fluid stream have been separated therefrom. Consequently, the valuable part of the second organic fluid-based waste fluid is separated therefrom and may be then used as raw material for a synthesis process or may be recycled within the process or the like, whereas the remaining part of the second organic fluid-based waste fluid is used as fuel for the incineration. Therefore, the amount of energy to be externally supplied into the process can be significantly reduced or even completely avoided. Controlling the process such that at least 70% of the energy necessary to incinerate the fourth concentrated water-based wastewater stream is generated by the sixth concentrated organic fluid-based waste fluid stream may be achieved by controlling or adjusting the process parameters accordingly, as further described in detail below.

In accordance with an embodiment of the present disclosure, the at least one second organic fluid-based waste fluid stream is subjected to at least one separation stage so as to produce a fifth purified product stream and a sixth concentrated organic fluid-based waste fluid stream. A purified product stream means in this regard a stream including one or more compound(s) as a major component, wherein the one or more compound(s) may be a product of the petrochemical process, may be a by-product of the petrochemical process and/or may be even an impurity of the petrochemical process. Decisive is only that the one or more compound(s) separated off in the at least one separation stage are of any value, i.e. may be used in the petrochemical process or in any other process as raw material, as catalyst or the like. Preferably, in the at least one separation stage, one compound is separated so that the fifth purified product stream mainly consists of this one compound and possibly minor amounts of impurities.

As set out above, in an embodiment of the present disclosure, the process is controlled such that the incineration of the sixth concentrated organic fluid-based waste fluid stream generates at least 70% of the energy necessary to incinerate the fourth concentrated water-based wastewater stream. This may be in particular achieved by adjusting during the process at least one of: the concentration degree during the at least one freeze concentration stage, the separation degree during the at least one separation stage, and the ratio between the fourth concentrated water-based wastewater stream and the sixth concentrated organic fluid-based waste fluid stream such that the incineration of the sixth concentrated organic fluid-based waste fluid stream generates at least 70% of the energy necessary to incinerate the fourth concentrated water-based wastewater stream. For instance, if more energy is needed for the incineration because the volume of the first water-based wastewater stream is comparably high, i) the concentration degree during the at least one freeze concentration stage may be increased so as to remove more water of this stream so as to reduce the amount of the water to be incinerated, ii) the ratio between the fourth concentrated water-based wastewater stream and the sixth concentrated organic fluid-based waste fluid stream may be decreased so that more of the concentrated organic fluid-based waste fluid stream as fuel based on a given volume of the fourth concentrated water-based wastewater stream is fed into the incineration, and/or iii) the separation degree during the at least one separation stage is decreased so that more of the organic fluid-based waste fluid is present as fuel for the incineration.

Taking into account that the initial concentration of impurities in the first water-based wastewater stream may be higher and/or the final concentration of impurities in the first water-based wastewater stream may be high, it is preferred that at least two and more preferably all of the concentration degree during the at least one freeze concentration stage, the separation degree during the at least one separation stage, and the ratio between the fourth concentrated water-based wastewater stream and the sixth concentrated organic fluid-based waste fluid stream are controlled during the process such that the incineration of the sixth concentrated organic fluid-based waste fluid stream generates at least 70% of the energy necessary to incinerate the fourth concentrated water-based wastewater stream.

In a further embodiment of the present disclosure, the process is controlled such that the incineration of the sixth concentrated organic fluid-based waste fluid stream generates at least 80%, preferably at least 90%, more preferably at least 95%, and most preferably at least all, of the energy necessary to incinerate the fourth concentrated water-based wastewater stream.

The present disclosure is not particularly limited concerning the composition of the at least one first water-based wastewater stream. However, it is preferred that the at least one first water-based wastewater stream includes 70 to 99.5% by weight of water and remainder to 100% by weight, i.e. 0.5 to 30% by weight of impurities being dissolved and/or dispersed in the water. Even more preferably, the at least one first water-based wastewater stream includes 80 to 95% by weight of water and remainder to 100% by weight, i.e. 5 to 20 by weight, of impurities dissolved and/or dispersed in the water.

Also concerning the kind of freeze concentration, the present disclosure is not particularly restricted. However, good results are in particular obtained, when the at least one first water-based wastewater stream is subjected for freeze concentration to at least one suspension crystallization stage or at least one layer crystallization stage. The layer crystallization stage may be a static crystallization stage or a falling film crystallization stage, with a static crystallization stage being preferred. For instance, the at least one first water-based wastewater stream is subjected for freeze concentration to one suspension crystallization stage or to one static crystallization stage. Alternatively, the at least one first water-based wastewater stream is subjected for freeze concentration to two or more suspension crystallization stages. Even more preferably, the at least one first water-based wastewater stream is subjected for freeze concentration to at least one suspension crystallization stage and to at least one static crystallization stage, wherein most preferably the at least one suspension crystallization stage is performed before the static crystallization stage.

In accordance with a first particular preferred embodiment of the present disclosure, the at least one first water-based wastewater stream is subjected for freeze concentration to at least one suspension crystallization stage. Suspension crystallization has the following advantages: only requiring a comparably compact layout, leading to a comparably high purity in only one step or stage, respectively, having a comparably low energy consumption, and having comparably low installation costs. Typically, suspension crystallization is divided into two steps, namely firstly the production of the crystals of the compound to be purified and secondly the separation of the crystals from the remaining mother liquor.

In view of this, it is preferred that the at least one suspension crystallization stage comprises at least one crystallization block for producing water crystals and at least one separation block for separating the crystals produced in the at least one crystallization block from the mother liquor. In one variant, the crystallization block comprises at least one scraped surface crystallizer for removing the crystallization heat and a growth vessel where the produced crystals have time to grow to a separable size, wherein the separation block preferably comprises at least one wash column. In an alternative and in fact preferred variant, the crystallization block comprises a scraped surface crystallizer, but no growth vessel. In this variant, the scraped surface crystallizer combines the function of crystallizer and growth vessel.

In accordance with a particular preferred embodiment of the present disclosure, the wash column comprises
a cylindrical vessel comprising:
a piston with a piston head and a piston rod, the piston being arranged reciprocatingly movable in the cylindrical vessel and bounding above the piston head a wash chamber inside the cylindrical vessel, and the piston head comprising at least one filter,
an inlet for supplying the crystal suspension mixture produced in the crystallization block composed of crystals and mother liquor into the cylindrical vessel,
an outlet for discharging the mother liquor from the cylindrical vessel, and
an outlet for discharging the crystals and/or crystal melt from the cylindrical vessel.

In a further embodiment of the present disclosure, the separation block comprises a circulation conduit for circulating melt arranged outside the cylindrical vessel, i.e., the cylindrical vessel is connected to a circulation conduit for circulating melt arranged outside the cylindrical vessel, which is in communication with the wash chamber and a means for partial melting and disintegration of the crystal bed arranged in the wash chamber for restricting the movement of the crystal bed that has been compacted in the wash chamber by the piston and for directing the wash liquid entering into the cylindrical vessel from the circulation conduit so as to homogeneously distribute it over the entire cross-section of the wash column.

Preferably, the at least one first water-based wastewater stream is subjected for freeze concentration to at least two stages, such as two suspension crystallization stages, in particular if a high concentration of the first water-based wastewater stream shall be obtained. Such a two stage suspension crystallization allows an about 10% higher concentration than a one stage suspension crystallization. Each of the two suspension crystallization stages comprises a crystallizer, wherein both crystallizers may have the same design or a different design. The first suspension crystallization stage comprises, in addition to its crystallizer, a wash column as described above, wherein the slurry obtained in the crystallizer of the first suspension crystallization stage is transported into the wash column, in which the crystals obtained in the crystallizer of the first suspension crystallization stage are separated from the mother liquor. While the crystals and/or crystal melt, respectively, are removed as the third clean water stream, the mother liquor obtained as filtrate of the wash column is transported into the crystallizer of the second suspension crystallization stage, which further comprises a thickener. The slurry obtained in the crystallizer of the second suspension crystallization stage is transported into the thickener. The slurry is compacted in the thickener to a packed crystal bed in the same way as in a wash column, but the crystal bed is not, or at least not completely, washed as it is in a wash column. While the crystal bed obtained in the thickener, after passing the means for disintegration of the crystal bed, is transported into the crystallizer of the first suspension crystallization stage, at least a part of the concentrate obtained as filtrate of the thickener is removed as the fourth concentrated water-based wastewater stream, whereas optionally another part of the concentrate is returned into the crystallizer of the second suspension crystallization stage.

In accordance with a second particular preferred embodiment of the present disclosure, the at least one first water-based wastewater stream is subjected for freeze concentration to at least one layer crystallization stage, which may be at least one falling film crystallization stage or preferably at least one static crystallization stage.

In accordance with a third particular preferred embodiment of the present disclosure, the at least one first water-based wastewater stream is subjected for freeze concentration to at least one suspension crystallization stage and to at least one layer crystallization stage, which may be at least one falling film crystallization stage or preferably at least one static crystallization stage. More preferably, the at least one first water-based wastewater stream is subjected for freeze concentration to one suspension crystallization stage and subsequently to one layer crystallization stage, wherein the layer crystallization stage is more preferably a static crystallization stage. The advantage of this embodiment is that the feed stream may be concentrated to a very high degree, i.e. that a first water-based wastewater streams may be treated so as to produce a third clean water stream and a fourth highly concentrated water-based wastewater stream, and this even in the case that the first water-based wastewater stream is comparably highly viscous. During suspension crystallization, the viscosity of the slurry exponentially increases with increasing concentration, thus setting an upper limit to the concentration in a suspension crystallization stage. When subjecting the mother liquor obtained in the suspension crystallization stage to a static crystallization stage, the concentration of the obtained fourth concentrated water-based wastewater stream can be further increased. Thus, the suspension crystallization stage preferably comprises a crystallizer and a wash column as described above, wherein the slurry obtained in the crystallizer of the suspension crystallization stage is transported into the wash column, in which the crystals obtained in the crystallizer of the suspension crystallization stage are separated from the mother liquor. While the crystals and/or crystal melt, respectively, are removed as the third clean water stream, the mother liquor obtained as filtrate of the wash column is transported into the static crystallizer of the static crystallization stage. The obtained mother liquor is withdrawn after the crystallization from the static crystallizer as the fourth concentrated water-based wastewater stream, whereas the crystals and/or crystal melt obtained in the static crystallizer of the static crystallization stage are transported into the feed to the crystallizer of the suspension crystallization stage.

Depending on the downstream application for the clean water, it is preferred that the third clean water stream obtained after the last of the at least one freeze concentration stage comprises less than 1,000 ppm, more preferably less than 100 ppm, still more preferably less than 50 ppm, and most preferably less than 10 ppm, of dissolved and/or dispersed impurities. Such a purified water stream may be used during the same process or in another process as clean water.

Furthermore, it is preferred that the fourth concentrated water-based wastewater stream comprises less than 90% by weight of water, more preferably less than 80% by weight of water, even more preferably less than 75% by weight of water, and most preferably at most 70% by weight of water, with the remainder to 100% by weight being impurities, which are dissolved and/or dispersed in the water. The impurities may be of organic and/or inorganic nature and may also include non-soluble substances, like salt(s) and/or finely dispersed organic phase droplets. For instance, the impurities may be an organic fluid, inorganic liquid and/or inorganic solid(s), such as one or more salts. The content of organic fluid in the fourth concentrated water-based wastewater stream is preferably at most 30% by weight, because otherwise the viscosity of the mother liquid during freeze concentration would be too high for a required efficient mass transfer during the freeze concentration, and the freezing point would undesirably decrease.

In a further embodiment of the present disclosure, it is proposed that the second organic fluid-based waste fluid stream includes 5 to 99.5% by weight, and preferably 10 to 30% by weight, of one or more organic compounds to be separated by the at least one separation stage and remainder to 100% by weight of one or more dissolved and/or dispersed impurities. Such a content of compound(s) to be separated by the at least one separation stage is high enough so that the desired compound(s) may be separated by the at least one separation stage with sufficiently low effort, but reasonable low enough so that enough fuel for the incineration remains.

The present disclosure is not particularly limited concerning the chemical nature of the one or more organic compounds to be separated by the at least one separation stage. For instance, the compound may be selected from the group consisting of: phenol, cumene, acetophenone, 1,3-butylene glycol, acrylic acetate, acrylonitrile and combinations of two or more of the aforementioned compounds.

The at least one separation stage used depends on the compound to be separated by the at least one separation stage. For example, the at least one separation stage, to which the second organic fluid-based waste fluid stream is subjected, is selected from the group consisting of: a layer crystallization stage, a distillation stage, an extraction stage, and combinations of two or more of the aforementioned stages.

Depending on the downstream application for the product obtained after separation by the at least one separation stage or its sellable grade, respectively, it is preferred that the fifth product stream obtained after the last of the at least one separation stage comprises less than 2,000 ppm, more preferably less than 1,000 ppm, still more preferably less than 100 ppm, yet more preferably less than 50 ppm, and most preferably less than 10 ppm, of dissolved and/or dispersed impurities.

The temperature, at which the fourth concentrated water-based wastewater stream and the sixth concentrated organic fluid-based waste fluid stream are incinerated in the incinerator, should be high enough so as to completely decompose any hydrocarbons and other impurities, but as low as possible so as to minimize the energy demand of the process. In view thereof, it is preferred that the fourth concentrated water-based wastewater stream and the sixth concentrated organic fluid-based waste fluid stream are incinerated in the incinerator at a temperature of at least 900° C., preferably between 900 and 1,100° C., more preferably between 900 and 1.000° C., and most preferably between 900 and 950° C. This may be achieved by appropriately adjusting the ratio between the fourth concentrated water-based wastewater stream and the sixth concentrated organic fluid-based waste fluid stream, i.e. by adjusting this ratio so that the incineration occurs at a temperature of at least 900° C., preferably between 900 and 1,100° C., more preferably between 900 and 1,000° C., and most preferably between 900 and 950° C.

On account of this reason, it is preferred that the sixth concentrated organic fluid-based waste fluid stream has a comparably high heat of combustion. Good results are obtained, when the sixth concentrated organic fluid-based waste fluid stream has a heat of combustion of at least 2,000 kJ/kg, more preferably at least 2,500 kJ/kg, and most preferably at least 2,800 kJ/kg.

As set out above, the ratio of the fourth concentrated water-based wastewater stream and the sixth concentrated organic fluid-based waste fluid stream is preferably controlled during the process and may be changed depending on fluctuations of the composition of the at least one first water-based wastewater stream and the at least one second organic fluid-based waste fluid stream. However, good results are in general Obtained, when the fourth concentrated water-based wastewater stream and the sixth concentrated organic fluid-based waste fluid stream are forwarded to the incinerator in a volume:volume-ratio of 2:1 to 10:1, preferably of 4:1 to 8:1 and more preferably of 5:1 to 7:1, such as of about 6:1.

Another aspect of the present disclosure is a plant for treating or purifying waste fluid generated during a petrochemical process, the waste fluid comprising a first water-based wastewater stream and a second organic fluid-based waste fluid stream, the plant comprising:
  a source for the first water-based wastewater stream and the second organic fluid-based waste fluid stream,
  at least one freeze concentration stage comprising: a first inlet line for supplying the first water-based wastewater stream into the at least one freeze concentration stage, a first outlet line for withdrawing a third clean water stream produced in the freeze concentration stage, and a second outlet line for withdrawing a fourth concentrated water-based wastewater stream produced in the freeze concentration stage,
  at least one separation stage comprising: a second inlet line for supplying the second organic fluid-based waste fluid stream into the at least one separation stage, a third outlet line for withdrawing a fifth purified product stream produced in the at least one separation stage, and a fourth outlet line for withdrawing a sixth concentrated organic fluid-based waste fluid stream produced in the at least one separation stage,
  an incinerator comprising: a third inlet line for supplying the fourth concentrated water-based wastewater stream and a fourth inlet line for supplying the sixth concentrated organic fluid-based waste fluid stream into the incinerator, and
  a control unit configured to control incineration of the sixth concentrated organic fluid-based waste fluid stream such that the incineration of the sixth concentrated organic fluid-based waste fluid stream generates at least 70% of an energy necessary to incinerate the fourth concentrated water-based wastewater stream.

Preferably, the control unit comprises at least one of a measurement device for the determination of the concentration of the fluid stream processed in the at least one freeze concentration stage, a measurement device for the determination of the separation degree during the at least one separation stage, and a device for controlling the ratio between the fourth concentrated water-based wastewater stream and the sixth concentrated organic fluid-based waste fluid stream fed into the incinerator.

In accordance with a preferred embodiment of the present disclosure, the at least one freeze concentration stage comprises at least one suspension crystallization stage and/or at least one static crystallization stage.

Preferably, the at least one separation stage is selected from the group consisting of: a layer crystallization stage, a distillation stage, an extraction stage and combinations of two or more of the aforementioned stages.

According to a particular preferred embodiment of the present disclosure, the at least one freeze concentration stage comprises: at least one suspension crystallization stage comprising at least one crystallization block for producing water crystals, and at least one separation block for separating the crystals produced in the at least one crystallization block from the mother liquor, wherein the crystallization block comprises at least one crystallizer, and wherein the separation block comprises at least one wash column. In one variant, the crystallization block comprises at least one scraped surface crystallizer for removing the crystallization heat and a growth vessel where the produced crystals have time to grow to a separable size. In an alternative and in fact preferred variant, the crystallization block comprises a scraped surface crystallizer, but no growth vessel. In this variant, the scraped surface crystallizer combines the function of crystallizer and growth vessel.

Moreover, it is preferred that the separation block comprises at least one wash column. Further preferably, the at least one wash column comprises
a cylindrical vessel comprising:
a piston with a piston head and a piston rod, the piston being arranged reciprocatingly movable in the cylindrical vessel and bounding above the piston head a wash chamber inside the cylindrical vessel, and the piston head comprising at least one filter,
an inlet line for supplying the crystal suspension mixture produced in the crystallization block composed of crystals and mother liquor into the cylindrical vessel,
an outlet line for discharging the mother liquor from the cylindrical vessel, and
an outlet line for discharging crystals and/or crystal melt from the cylindrical vessel.

In accordance with a further particular preferred embodiment of the present disclosure, the at least one freeze concentration stage comprises at least two, and more preferably two, suspension crystallization stages. Preferably, each of the at least two suspension crystallization stages comprises a suspension crystallizer, wherein both suspension crystallizers may have the same design or a different design. The first suspension crystallization stage comprises, in addition to its crystallizer, a wash column as described above and a line connecting the crystallizer with the wash column so that the slurry obtained in the crystallizer of the first suspension crystallization stage is transported into the wash column, in which the crystals obtained in the crystallizer of the first suspension crystallization stage are separated from the mother liquor. The wash column comprises a removal line for crystals and/or crystal melt, respectively, and a line connecting the wash column and the second suspension crystallization stage so that mother liquor obtained as filtrate of the wash column is transported into the crystallizer of the second suspension crystallization stage. The second suspension crystallization stage further comprises a thickener, as well as a line connecting the crystallizer with the thickener, so that the slurry obtained in the crystallizer of the second suspension crystallization stage is transported into the thickener. The thickener comprises a line connecting the thickener with the crystallizer of the first suspension stage so that the crystal bed, after passing the means for disintegration of the crystal bed, obtained in the thickener is transported into the crystallizer of the first suspension crystallization stage. Moreover, the thickener comprises a line for removing the concentrate obtained in the thickener as filtrate, wherein this line may split into a removal line and into a recirculation line so that at least a part of the concentrate obtained as filtrate of the thickener is removed as fourth concentrated water-based wastewater stream, whereas optionally another part of the concentrate is returned into the crystallizer of the second suspension crystallization stage.

In accordance with a further particular preferred embodiment of the present disclosure, the at least one freeze concentration stage comprises at least one suspension crystallization stage and at least one layer crystallization stage, which may be at least one falling film crystallization stage or preferably at least one static crystallization stage. More preferably, the at least one freeze concentration stage comprises one suspension crystallization stage and downstream thereof one layer crystallization stage, wherein the layer crystallization stage is more preferably a static crystallization stage. Preferably, the suspension crystallization stage comprises a suspension crystallizer and a wash column as described above. The wash column comprises a removal line for crystals and/or crystal melt, respectively, and a line connecting the wash column and the second static crystallization stage so that mother liquor obtained as filtrate of the wash column is transported into the crystallizer of the second suspension crystallization stage. The freeze concentration stage further comprises a line connecting the static crystallizer of the second static crystallization stage with the crystallizer of the first suspension crystallization stage so that the crystals and/or crystal melt obtained in the crystallizer of the second static crystallization stage are transported into the crystallizer of the first suspension crystallization stage or into the feed to the crystallizer of the first suspension crystallization stage. Moreover, the crystallizer of the second static crystallization stage comprises a removal line for removing the mother liquor obtained in the crystallizer of the second static crystallization stage as the fourth concentrated water-based wastewater stream.

BRIEF DESCRIPTION OF THE DRAWINGS

The invention will be explained in more detail hereinafter with reference to the drawings.

Figure 1:
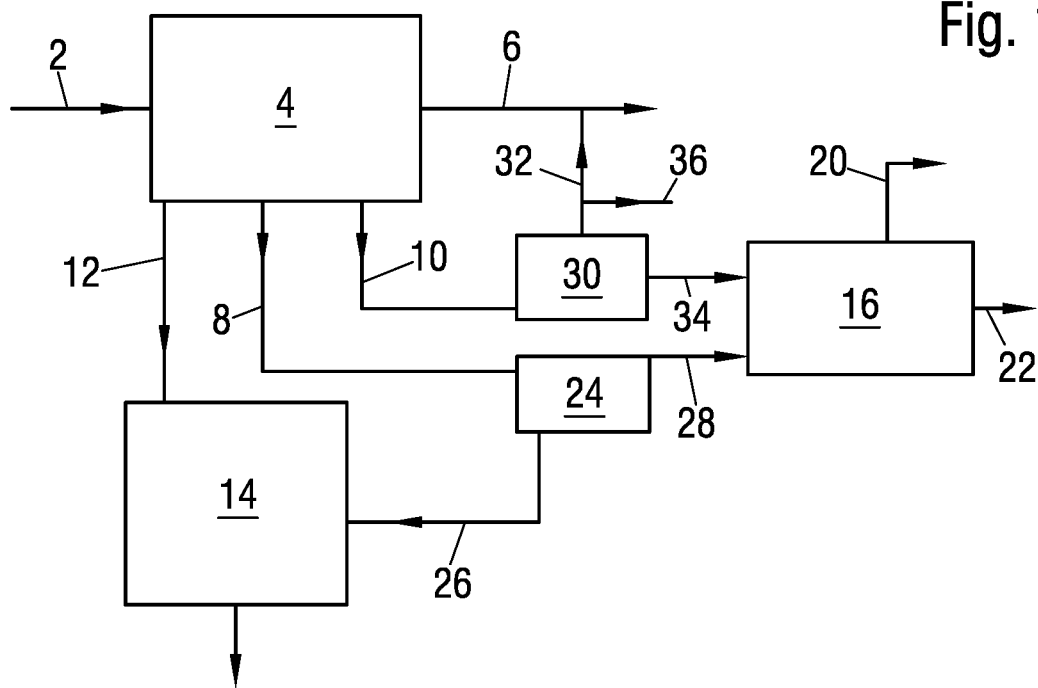
FIG. 1 is a schematic view of a process and a plant for treating waste fluid generated during a petrochemical process, wherein the waste fluid comprises at least one first water-based wastewater stream and at least one second organic fluid-based waste fluid stream, in accordance with one embodiment of the present disclosure.

In the process in accordance with the present disclosure shown in FIG. 1, raw materials 2 are fed to a petrochemical main process 4, in which they are processed to a main product 6. During the process, also a first water-based wastewater stream 8, a second organic fluid-based waste fluid stream 10 and optionally further waste 12 is generated. For instance, the main process 4 is a process for producing cumene hydroperoxide and the raw materials 2 are benzene and propylene leading to cumene hydroperoxide as main product 6. In this case, the first water-based wastewater stream 8 contains methanol, acetone, phenol, cumene and other compounds, whereas the second organic fluid-based waste fluid stream 10 contains acetophenone and the further waste 12 contains other by-products. The further waste 12 is disposed and/or subjected to a primary treatment in device 14. The first water-based wastewater stream 8 is led into a freeze concentration stage 24, in which the first water-based wastewater stream 8 is separated into a third clean water stream 26 and a fourth concentrated water-based wastewater stream 28. While the third clean water stream 26 is led to the disposal and/or primary treatment device 14, the fourth concentrated water-based wastewater stream 28 is led into the incinerator 16. Moreover, the second organic fluid-based waste fluid stream 10 is led into a separation stage 30, in which the second organic fluid-based waste fluid stream 10 is separated into a fifth purified product stream 32 and a sixth concentrated organic fluid-based waste fluid stream 34. While the fifth purified product stream 32 is, after some by-product 36 has been removed therefrom, combined with the main product 6, the sixth concentrated organic fluid-based waste fluid stream 34 is led into the incinerator 16. In accordance with the present disclosure, the process is controlled by a control unit (not shown) so that the incineration of the sixth concentrated organic fluid-based waste fluid stream 34 generates at least 70% of the energy necessary to incinerate the fourth concentrated water-based wastewater stream 28 and, thus, at least the major part of the energy required for the incineration of the fourth concentrated water-based wastewater stream 28 is exploited from the sixth concentrated organic fluid-based waste fluid stream 34 being generated during the main process 4. In other words, the sixth concentrated organic fluid-based waste fluid stream 34 is used as fuel for the incineration, however, only after one or more valuable compounds being included in the second organic fluid-based waste fluid stream 10 have been separated therefrom. Consequently, the valuable part of the second organic fluid-based waste fluid 10 is separated therefrom and may be then used as raw material for a synthesis process or may be recycled within the process or the like, whereas the remaining part of the second organic fluid-based waste fluid 10 is used as fuel for the incineration. Therefore, the amount of energy to be externally supplied into the process can be significantly reduced or even completely avoided. Controlling the process such that at least 70% of the energy necessary to incinerate the fourth concentrated water-based wastewater stream 28 is generated by the sixth concentrated organic fluid-based waste fluid stream 34 may be achieved by adjusting during the process at least one of: the concentration degree during the freeze concentration stage 24, the separation degree during the separation stage 30, and the ratio between the fourth concentrated water-based wastewater stream 28 and the sixth concentrated organic fluid-based waste fluid stream 34 so that the incineration of the sixth concentrated organic fluid-based waste fluid stream 34 generates at least 70% of the energy necessary to incinerate the fourth concentrated water-based wastewater stream 28.

Figure 2:
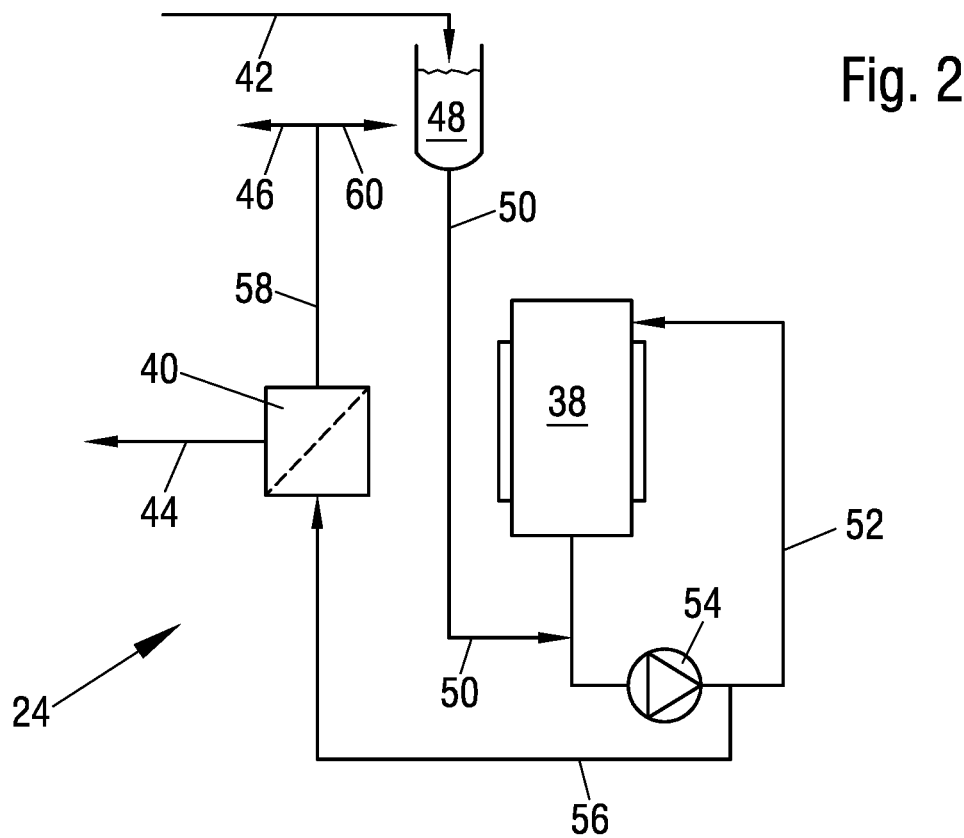
FIG. 2 is a schematic view of a freeze concentration stage of a process and plant in accordance with an embodiment of the present disclosure.

FIG. 2 is a schematic view of a freeze concentration stage 24 of a process and plant in accordance with one embodiment of the present disclosure, such as a process and plant shown in FIG. 1 and as described above. The freeze concentration stage 24 comprises a suspension crystallizer 38 for producing water crystals, a wash column 40 for separating the crystals produced in the at least one crystallization block from the mother liquor, an inlet line 42 for supplying the first water-based wastewater stream into the freeze concentration stage 24, an outlet line 44 for withdrawing a third clean water stream produced in the freeze concentration stage 24, and an outlet line 46 for withdrawing a fourth concentrated water-based wastewater stream produced in the freeze concentration stage 24. Moreover, the freeze concentration stage 24 comprises a feed tank 48, which is connected with the inlet 42 and with a feed line 50 leading into the suspension crystallizer 38. Moreover, the suspension crystallizer 38 is provided with a circulation line 52 comprising a pump 54. A slurry line 56 leads from the circulation line 52 to the wash column 40. In addition, the wash column 40 is connected with a concentrate line 58, which splits into the outlet line 46 and into a return line 60. During the operation of the plant, a first water-based wastewater stream is transported via the inlet line 42 into the feed tank 48 and from the feed tank 48 via feed line 50 into the suspension crystallizer 38, in which the water crystals are formed so as to obtain a slurry comprising the water crystals and mother liquor. The slurry is recirculated via the circulation line 52, from which a part of the slurry is transported via the slurry line 56 into the wash column 40. Water crystals are separated from the mother liquor in the wash column 40, wherein the water crystals are withdrawn from the freeze concentration stage 24 as melt via the outlet line 44 as the third clean water stream. The mother liquor obtained in the wash column 40 is transported from the wash column 40 via the concentrate line 58, from which a part is withdrawn as the fourth concentrated water-based wastewater stream via the outlet line 46 and the other part is transported into the feed tank 48 via the return line 60.

Figure 3:
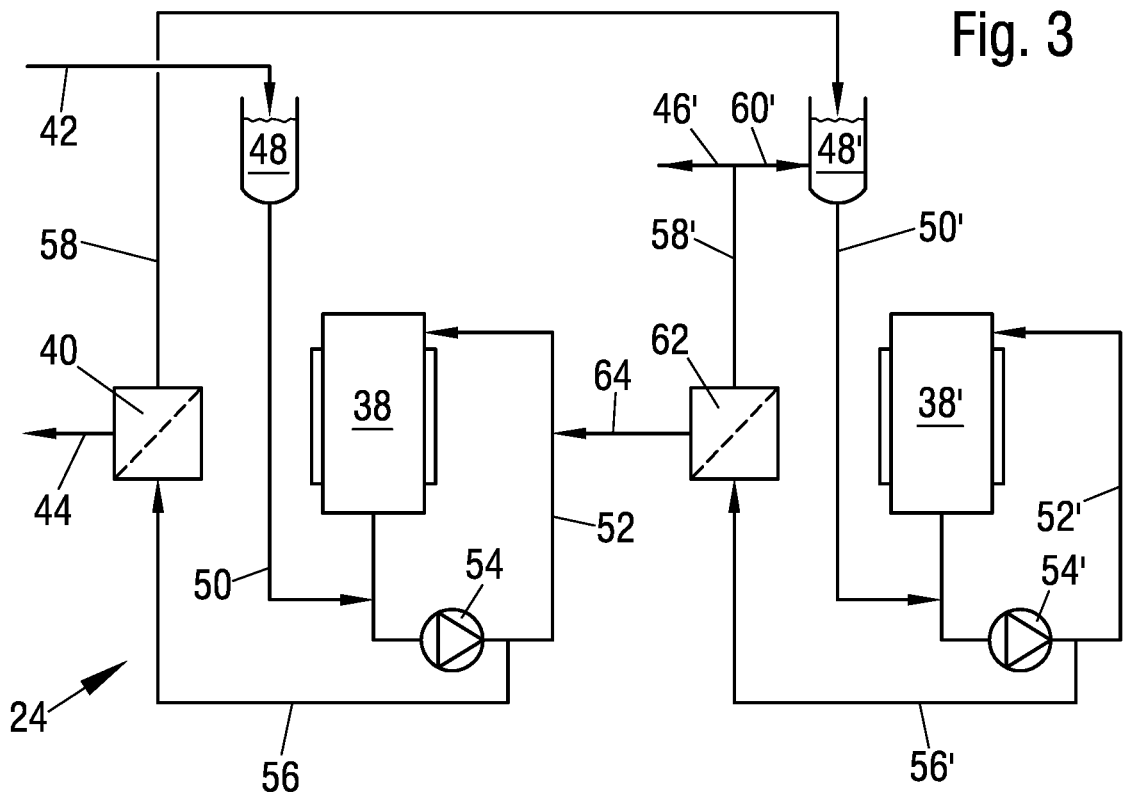
FIG. 3 is a schematic view of a freeze concentration stage of a process and plant in accordance with another embodiment of the present disclosure.

FIG. 3 is a schematic view of a freeze concentration stage 24 in accordance with another embodiment of the present disclosure, which comprises two suspension crystallization stages. Each of the two suspension crystallization stages comprises a suspension crystallizer 38, 38', wherein the first suspension crystallization stage is embodied as described above with reference to FIG. 2 with the difference that the concentrate line 58 does not split into an outlet line 46 and a return line 60. Rather, the concentrate line 58 leads to a feed tank 48' of the second suspension crystallization stage, which further comprises a thickener 62. The feed tank 48' of the second suspension crystallization stage is connected with a feed line 50' leading into the suspension crystallizer 38'. Moreover, the suspension crystallizer 38' is provided with a circulation line 52' comprising a pump 54'. A slurry line 56' leads from the circulation line 52' to the thickener 62. In addition, the thickener 62 is connected with a concentrate line 58', which splits into the outlet line 46' and into a return line 60'. Moreover, the thickener 62 is connected with a line 64 leading into the circulation line 52 of the first suspension crystallization stage. During the operation of the plant, a first water-based wastewater stream is transported via the inlet line 42 into the feed tank 48 of the first suspension crystallization stage and processed there as described above with reference to FIG. 2, except that the mother liquor obtained in the wash column 40 is not partially withdrawn and partially fed into the feed tank 48. Rather, the mother liquor obtained in the wash column 40 is transported from the wash column 40 via the concentrate line 58 into the feed tank 48' of the second suspension crystallization stage. From there, the mother liquor or feed, respectively, is fed via the feed line 50' into the suspension crystallizer 38', in which the water crystals are formed so as to obtain a slurry comprising the water crystals and mother liquor. The slurry is recirculated via the circulation line 52', from which a part of the slurry is transported via the slurry line 56' into the thickener 62. The crystal bed obtained in the thickener is, after passing the means for disintegration of the crystal bed, transported via line 64 into the circulation line 52 of the first suspension crystallization stage. The concentrate obtained in the thickener 62 as filtrate is transported from the thickener 62 via the concentrate line 58', from which a part is withdrawn as the fourth concentrated water-based wastewater stream via the outlet line 46' and the other part is transported into the feed tank 48' via the return line 60'.

Figure 4:
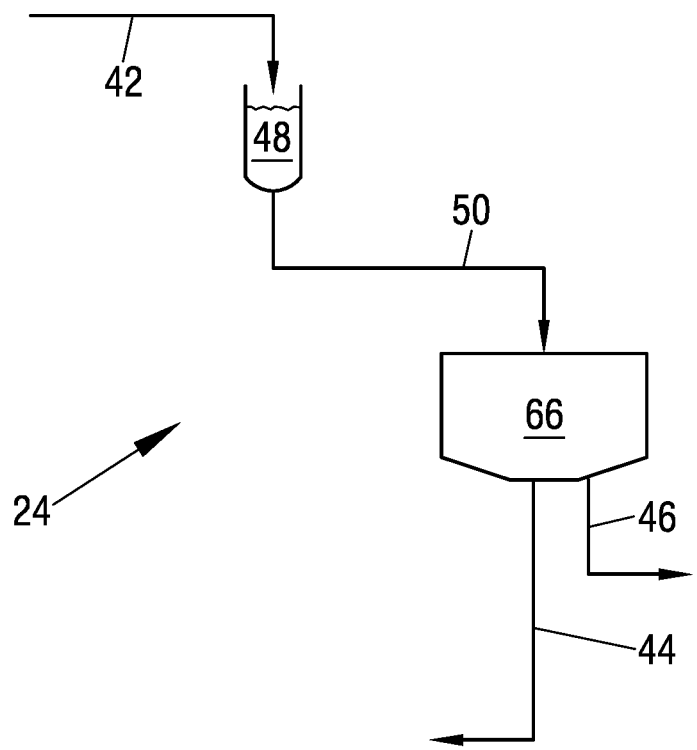
FIG. 4 is a schematic view of a freeze concentration stage of a process and plant in accordance with an embodiment of the present disclosure.

FIG. 4 is a schematic view of a freeze concentration stage 24 in accordance with another embodiment of the present disclosure, which comprises one static crystallization stage. The static crystallization stage comprises a static crystallizer 66, a feed tank 48, an inlet line 42, a feed line 50, an outlet line 44 for a third clean water stream as well as an outlet line 46 for withdrawing a fourth concentrated water-based wastewater stream. During the operation of the plant, a first water-based wastewater stream is transported via the inlet line 42 into the feed tank 48 and from the feed tank 48 via feed line 50 into the static crystallizer 66, in which water crystals are formed on cooled plates contained in the static crystallizer 66 so as to obtain crystal layers and a mother liquor. After termination of the crystallization, the mother liquor is withdrawn from the static crystallizer 66 via outlet line 46 as the fourth concentrated water-based wastewater stream and then the crystal layers are molten and the melt is withdrawn via outlet line 44 as the third clean water stream.

Figure 5:
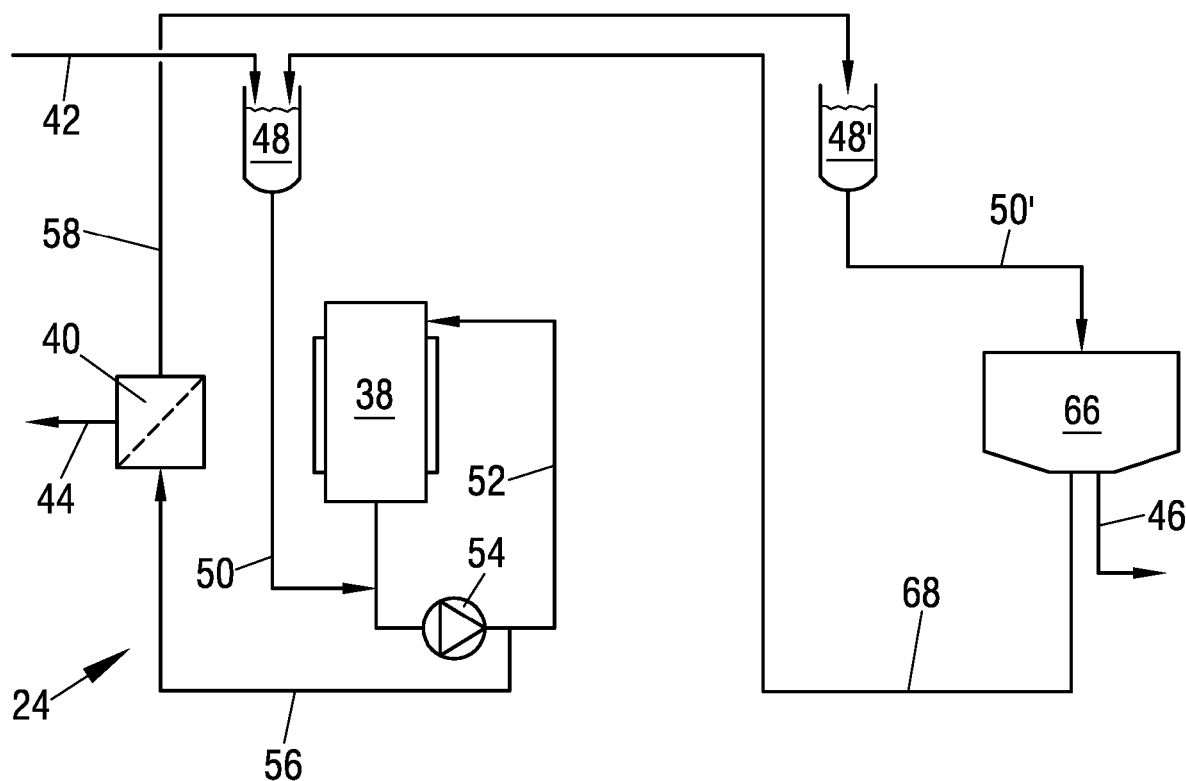
FIG. 5 is a schematic view of a freeze concentration stage of a process and plant in accordance with another embodiment of the present disclosure.

FIG. 5 is a schematic view of a freeze concentration stage 24 in accordance with another embodiment of the present disclosure, which comprises one suspension crystallization stage and one static crystallization stage. The suspension crystallization stage is embodied as described above with reference to FIG. 2 with the difference that the concentrate line 58 does not split into an outlet line 46 and a return line 60. Rather, the concentrate line 58 leads to a feed tank 48' of the static crystallization stage. The static crystallization stage further comprises a static crystallizer 66, an outlet line 46 for a fourth concentrated water-based wastewater stream and a line 68 for transporting crystal melt of intermediate purity obtained after having molten the crystal layers formed on the cooled surfaces of the static crystallizer into the feed tank of the suspension crystallization stage. During the operation of the plant, a first water-based wastewater stream is transported via the inlet line 42 into the feed tank 48 of the first suspension crystallization stage and processed there as described above with reference to FIG. 2, except that the mother liquor Obtained in the wash column 40 is not partially withdrawn and partially fed into the feed tank 48. Rather, the mother liquor obtained in the wash column 40 is transported from the wash column 40 via the concentrate line 58 into the feed tank 48' of the static crystallization stage. From there, the mother liquor or feed, respectively, is fed via the feed line 50' into the static crystallizer 66, in which water crystals are formed on cooled plates contained in the static crystallizer 66 so as to obtain crystal layers and a mother liquor. The mother liquor is withdrawn via the outlet line 46 as the fourth concentrated water-based wastewater stream, wherein the molten crystal layers obtained in the static crystallizer 66 are withdrawn from the static crystallizer 66 and transported via the line 68 into the feed tank 48 of the suspension crystallization stage.

The invention claimed is:

1. A process for treating waste fluid generated during a petrochemical process, the waste fluid comprising at least one first water-based wastewater stream and at least one second organic fluid-based waste fluid stream, the process comprising:
subjecting the at least one first water-based wastewater stream to at least one freeze concentration stage so as to produce a third clean water stream and a fourth concentrated water-based wastewater stream,
subjecting the at least one second organic fluid-based waste fluid stream to at least one separation stage so as to produce a fifth purified product stream and a sixth concentrated organic fluid-based waste fluid stream, and
forwarding the fourth concentrated water-based wastewater stream and the sixth concentrated organic fluid-based waste fluid stream to an incinerator and incinerating the fourth concentrated water-based wastewater stream and the sixth concentrated organic fluid-based waste fluid stream in the incinerator,
the process being controlled by adjusting at least one of a concentration degree during the at least one freeze concentration stage, a separation degree during the at least one separation stage, and a ratio between the fourth concentrated water-based wastewater stream and the sixth concentrated organic fluid-based waste fluid stream such that incineration of the sixth concentrated organic fluid-based waste fluid stream generates at least 70% of an energy necessary to incinerate the fourth concentrated water-based wastewater stream.

2. The process in accordance with claim 1, wherein the process is controlled such that the incineration of the sixth concentrated organic fluid-based waste fluid stream generates at least 80% of the energy necessary to incinerate the fourth concentrated water-based wastewater stream.

3. The process in accordance with claim 1, wherein the at least one first water-based wastewater stream includes 70 to 99.5% by weight of water and 0.5 to 30% by weight of at least one of dissolved and dispersed impurities.

4. The process in accordance with claim 1, wherein:
the at least one freeze concentration stage includes at least one suspension crystallization stage,
the at least one suspension crystallization stage comprises at least one crystallization block for producing water crystals and at least one separation block for separating the water crystals produced in the at least one crystallization block from a mother liquor,
the at least one crystallization block comprises at least one scraped surface crystallizer, and
the separation block comprises at least one wash column, the wash column comprising a cylindrical vessel, the cylindrical vessel comprising:
a piston with a piston head and a piston rod, the piston being arranged reciprocatingly movable in the cylindrical vessel and bounding above the piston head a wash chamber inside the cylindrical vessel, and the piston head comprising at least one filter,
an inlet for supplying a crystal suspension mixture produced in the at least one crystallization block to the cylindrical vessel, the crystal suspension mixture composed of the water crystals and the mother liquor,
an outlet for discharging the mother liquor from the cylindrical vessel, and
an outlet for discharging at least one of the water crystals and a crystal melt from the cylindrical vessel.

5. The process in accordance with claim 4, wherein the cylindrical vessel is connected to a circulation conduit for circulating melt arranged outside the cylindrical vessel, the circulation conduit being in communication with the wash chamber and a means for partial melting and disintegration of a crystal bed arranged in the wash chamber, for restricting movement of the crystal bed that has been compacted in the wash chamber by the piston, and for directing wash liquid entering into the cylindrical vessel from the circulation conduit so as to homogeneously distribute the wash liquid over an entire cross-section of the wash column.

6. The process in accordance with claim 1, wherein the at least one freeze concentration stage includes at least one static crystallization stage.

7. The process in accordance with claim 1, wherein the at least one freeze concentration stage includes: at least two suspension crystallization stages, or at least one suspension crystallization stage and at least one static crystallization stage with the at least one static crystallization stage being downstream of the at least one suspension crystallization stage.

8. The process in accordance with claim 1, wherein the second organic fluid-based waste fluid stream includes 5 to 99.5% by weight of one or more organic compounds to be separated by the at least one separation stage, and a remainder of the second organic fluid-based waste fluid stream including at least one of one or more dissolved impurities and dispersed impurities.

9. The process in accordance with claim 8, wherein the one or more organic compounds are selected from the group consisting of: phenol, cumene, acetophenone, 1,3-butylene glycol, acrylic acetate, acrylonitrile and combinations thereof.

10. The process in accordance with claim 1, wherein the at least one separation stage is selected from the group consisting of: a layer crystallization stage, a distillation stage, an extraction stage, and combinations thereof.

11. The process in accordance with claim 1, wherein the fifth purified product stream comprises less than 2,000 ppm of at least one of dissolved impurities and dispersed impurities.

12. The process in accordance with claim 1, wherein a ratio between the fourth concentrated water-based wastewater stream and the sixth concentrated organic fluid-based waste fluid stream is adjusted such that the incineration of the fourth concentrated water-based wastewater stream and the sixth concentrated organic fluid-based waste fluid stream occurs at a temperature of at least 900° C.

13. A plant for treating waste fluid generated during a petrochemical process, the waste fluid comprising a first water-based wastewater stream and a second organic fluid-based waste fluid stream, the plant comprising:
a source for the first water-based wastewater stream and the second organic fluid-based waste fluid stream,
at least one freeze concentration stage comprising: a first inlet line for supplying the first water-based wastewater stream into the at least one freeze concentration stage, a first outlet line for withdrawing a third clean water stream produced in the freeze concentration stage, and a second outlet line for withdrawing a fourth concentrated water-based wastewater stream produced in the at least one freeze concentration stage,
at least one separation stage comprising: a second inlet line for supplying the second organic fluid-based waste fluid stream into the at least one separation stage, a third outlet line for withdrawing a fifth purified product stream produced in the at least one separation stage, and a fourth outlet line for withdrawing a sixth concentrated organic fluid-based waste fluid stream produced in the at least one separation stage,
an incinerator comprising: a third inlet line for supplying the fourth concentrated water-based wastewater stream into the incinerator and a fourth inlet line for supplying the sixth concentrated organic fluid-based waste fluid stream into the incinerator, and
a control unit configured to control incineration of the sixth concentrated organic fluid-based waste fluid stream such that the incineration of the sixth concentrated organic fluid-based waste fluid stream generates at least 70% of an energy necessary to incinerate the fourth concentrated water-based wastewater stream, wherein the control unit comprises at least one of:
a measurement device for determination of a concentration of a fluid stream processed in the at least one freeze concentration stage,
a measurement device for determination of a separation degree during the at least one separation stage, and
a device for controlling a ratio between the fourth concentrated water-based wastewater stream and the sixth concentrated organic fluid-based waste fluid stream being fed into the incinerator.

14. The plant in accordance with claim 13, wherein:
the at least one freeze concentration stage comprises at least one of at least one suspension crystallization stage and at least one static crystallization stage, and
the at least one separation stage is selected from the group consisting of: a layer crystallization stage, a distillation stage, an extraction stage and combinations thereof.

15. The plant in accordance with claim 13, wherein:
the at least one freeze concentration stage comprises at least one suspension crystallization stage, the at least one suspension crystallization stage comprising: at least one crystallization block for producing water crystals, and at least one separation block for separating the water crystals produced in the at least one crystallization block from a mother liquor,
the at least one crystallization block comprises at least one crystallizer, and
the at least one separation block comprises at least one wash column, the wash column comprising a cylindrical vessel, the cylindrical vessel comprising:
a piston with a piston head and a piston rod, the piston being arranged reciprocatingly movable in the cylindrical vessel and bounding above the piston head a wash chamber inside the cylindrical vessel, and the piston head comprising at least one filter,
an inlet line for supplying a crystal suspension mixture produced in the at least one crystallization block to the cylindrical vessel, the crystal suspension mixture composed of the water crystals and the mother liquor,
an outlet line for discharging the mother liquor from the cylindrical vessel, and
an outlet line for discharging at least one of the water crystals and a crystal melt from the cylindrical vessel.

16. The process in accordance with claim 13, wherein the at least one freeze concentration stage comprises: at least two suspension crystallization stages, or at least one suspension crystallization stage and at least one static crystallization stage.

* * * * *